(12) United States Patent
Lusk et al.

(10) Patent No.: US 6,412,833 B2
(45) Date of Patent: Jul. 2, 2002

(54) KNOT TEACHING, TYING AND DEVELOPING SYSTEM

(76) Inventors: Darryl S. Lusk; Sara K. Lusk, both of 1500 W. Plum St., Apt. 3G, Fort Collins, CO (US) 80521

(*) Notice: Subject to any disclaimer, the term of this patent is extended or adjusted under 35 U.S.C. 154(b) by 0 days.

(21) Appl. No.: 09/727,930

(22) Filed: Nov. 30, 2000

Related U.S. Application Data
(60) Provisional application No. 60/168,086, filed on Nov. 30, 1999.

(51) Int. Cl.$^7$ ................................................. D03J 3/00
(52) U.S. Cl. ........................ 289/17; 289/1.5; 289/18.1
(58) Field of Search ......................... 289/1.2, 1.5, 16.5, 289/17, 18.1; 2/144, 148, 152.1; 114/218; 223/81–83, 111, 113; 434/260

(56) References Cited

U.S. PATENT DOCUMENTS

| | | |
|---|---|---|
| 115,826 A | 6/1871 | Creed |
| 332,271 A | 12/1885 | Halter |
| 366,972 A | 7/1887 | Michaelis |
| 377,063 A | 1/1888 | Chambard |
| 456,210 A | 7/1891 | Young et al. |
| 551,836 A | 12/1895 | Provan |
| 585,564 A | 6/1897 | Freeman |
| 614,621 A | 11/1898 | Palmer |
| 987,407 A | 3/1911 | Scott |
| 2,385,197 A * | 9/1945 | Eisel .......................... 434/260 |
| 2,595,235 A * | 5/1952 | Emrich ........................ 289/17 |
| 2,624,957 A * | 1/1953 | Collins ........................ 289/17 |
| 3,126,858 A * | 3/1964 | Rosinski ..................... 114/218 |
| 3,700,272 A * | 10/1972 | Bauer .......................... 289/17 |
| 3,787,081 A * | 1/1974 | Macy ........................... 289/17 |
| 3,948,203 A * | 4/1976 | Matthews ................... 114/218 |
| 3,996,876 A * | 12/1976 | Sinclair ...................... 114/218 |

(List continued on next page.)

OTHER PUBLICATIONS

Ashley, C., "The Ashley Book of Knots", Published by Doubleday, 4 pages (1944).
Bigon, M. and Regazzoni, G., "The Morrow Guide to Knots", William Morrow and Company Publishing, 4 pages (1981).
Budworth, G., "The Complete Book of Knots", The Lyons Press, 4 pages (1997).
Budworth, G. "The Ultimate Encyclopedia of Knots and Ropework", Lorenz Books, 4 pages (1999).
Cassidy, J. "The Klutz Book of Knots", Published by Klutz, 3 pages (1985).
Day, Cyrus L., "Knots and Splices", International Marine Publishing Company, 4 pages (1953).
Lewis, D., "Great Knots & How to Tie Them", Sterling Publishing Company, 4 pages (1988).
MacFarlan, Allan & Paulette, "Knotcraft", Published by Bonanza Books, 3 pages (1967).
Packaging for "The Camper's Knot Tying", Marco Products, 1 item, (1986).
Pawson, D., "The Handbook of Knots", DK Publishing, Inc., 4 pages (1998).
Snyder, Paul & Arthur, "Nautical Knots and Lines", International Marine/Ragged Mountain Press, 4 pages (1997).
Wheelock, W., "Ropes, Knots and Slings for Climbers", La Siesta Press, 4 pages (1988).

Primary Examiner—John J. Calvert
Assistant Examiner—Gary L. Welch
(74) Attorney, Agent, or Firm—Santangelo Law Offices, P.C.

(57) ABSTRACT

A knot teaching, tying, and developing system that provides a knot tie contiguity that combines knot tie elements in various embodiments. The knot tie contiguity can further include a knot material differentiation element. The knot tie contiguity can further include a hold down that allows the device to be secured for various knotting applications. A kit may comprise a container in which the knot tie contiguity, knotting material, and instructions are placed.

16 Claims, 21 Drawing Sheets

U.S. PATENT DOCUMENTS

| | | | | |
|---|---|---|---|---|
| 4,017,071 A | * | 4/1977 | Wright | 289/16.5 |
| 4,034,443 A | | 7/1977 | Turner | 24/129 R |
| 4,092,786 A | * | 6/1978 | Neese | 434/260 |
| 4,607,869 A | * | 8/1986 | Bersche | 289/17 |
| 4,973,090 A | * | 11/1990 | Hyduke | 289/1.5 |
| 4,978,304 A | * | 12/1990 | Alexander | 434/260 |
| 5,098,137 A | | 3/1992 | Wardall | 289/17 |
| 5,230,295 A | | 7/1993 | Shell | 114/218 |
| 5,240,295 A | * | 8/1993 | Spencer | 289/1.5 |
| 5,261,343 A | | 11/1993 | Elterman et al. | 114/218 |
| 5,573,286 A | * | 11/1996 | Rogozinski | 289/1.5 |
| 5,593,189 A | | 1/1997 | Little | 289/17 |
| 5,676,508 A | | 10/1997 | Weicht | 410/101 |
| 5,690,370 A | * | 11/1997 | Steck, III | 289/17 |
| 6,217,086 B1 | * | 4/2001 | LeTourneau | 289/18.1 |

* cited by examiner

KNOT TEACHING, TYING AND DEVELOPING SYSTEM

This application claims the benefit of U.S. Provisional Application No. 60/168,086 filed on Nov. 30, 1999.

BACKGROUND OF THE INVENTION

Generally, embodiments of the invention relate to a knot teaching, tying, and developing system that allows for attachment and detachment of a rope, strap, or other knot material(s). Specifically, the invention provides a knot tie contiguity for the purpose of teaching and developing knot tying and for practical hardware application(s).

Conventional knot tying systems have been directed toward facilitating knot tying for a specific purpose, object, or field. Some efforts in this regard include those disclosed by U.S. Pat. Nos. 5,676,508; 5,261,343; 377,063; 5,230,295; 4,034,443 or 551,836 which include designs used for specific purposes, such as lifting or tying down heavy loads. Similarly, U.S. Pat. Nos. 987,407; 456,210; 366,972; 614,621; and 332,271 show conventional knot tie devices that are to be used only for specific objects such as halters or hammocks. Finally, other knot tie devices disclosed by U.S. Pat. Nos. 585,564; 5,098,137; 5,593,189; and 115,826 are used only for specific fields such as fishing or sailing.

Perhaps one of the most significant problems with conventional knot tying systems may be that it falls into two conventional categories of instruction. Those that have pictures, and those that have pictures with related or non-related hardware.

The first category, for example, uses pictures of hardware but does not actually provide the hardware for hands on use by the consumer. This can leave the consumer in a position of foraging on their own to acquire something that can simulate the hardware represented in the pictures. Therefore, teaching knot tying from a literature only position can be inadequate. See for example, Ashley C. W., *The Ashley Book of Knots*, Doubleday, New York (1944); Bigon, M. & Regazzoni, G., *The Morrow Guide to Knots*, Quill, William Morrow and Company, Inc. New York (1982); Budworth, G., *The Complete Book of Knots*, The Lyons Press, New York (1997); Budworth, G., *The Ultimate Encyclopedia of Knots and Ropework*, Anness Publishing Limited, New York (1999); Day, C. L., *Knots & Splices*, International Marine Publishing Company (1989); Lewis, D., *Great Knots and How to Tie Them*, Sterling Publishing Company (1998); Macfarlan, A. & P., *Knotcraft. The Art of Knot Tying*, Bonanza Books, New York (1967); Pawson, D., *The Handbook of Knots. A Step-By-Step Guide to Tying and Using More Than 100 Knots*, A D/C Publishing, Inc. (1998); Snyder, P. &A., *Nautical Knots and Lines Illustrated*, International Marine/Ragged Mountain Press (1997); Wheelock, W., *Ropes, Knots, & Slings for Climbers*, La Siesta Press (1988), each hereby incorporated by reference herein.

The second category of conventional knot tie devices use pictures with a tying aid that may not be representative of the actual hardware the knot would be tied to in practice. This approach may not provide the consumer with accurate physical representation of the hardware needed for knot tying. As a result, the consumer ends up practicing tying onto obscure unrelated objects, one piece of hardware, or into thin air. This can create a stagnated and impractical learning experience as can be understood by reviewing Cassidy, J., *The Klutz Book of Knots*, Klutz (1985); or *The Campers Knot Tying*, Marco Products (1986), each hereby incorporated by reference herein.

Another significant problem with conventional knot tying systems may be the failure to provide suitable mounts for hardware, if any, that is provided. Hardware falls into two distinct categories, mountable and non-mountable. Some mountable pieces may be: line cleat, rope loop, knob, pole, eyelet, strap loop, and tie down hook. Some non-mountable pieces may be: ring, toggle, fishing hook, tent stake, and open or closed "S" hook. Conventional mountable hardware may need to be individually attached to a surface such as a table or bench. This can be difficult because the hardware must be mounted properly, and mounting the hardware can damage the mounting surface. Again, once mounted the hardware may not be portable and the consumer should not be expected to carry additional separate pieces around in case they are needed.

Another significant problem with conventional tying systems can be that they may not allow the use of a variety of knot materials. For example, conventional devices may not provide tying features for use with a variety of diameters of knot material. Similarly, conventional devices may not provide tying features for use with strap type knot material.

Yet another significant problem with conventional knot tying systems can be that the various types of hardware are not supplied or supplied as separate pieces. As such, there can be a difficulty in finding proper hardware because many stores simply do not carry the types of hardware necessary. This can cause the consumer difficulty in looking for and purchasing the needed hardware to complete the learning experience. The consumer may be unaware of what kind of hardware to acquire since the literature may not address this issue. Again, once the hardware has been acquired, the consumer may be unaware of its proper usage or the hardware may be lost or misplaced due to the number of pieces. Also, purchasing the necessary hardware as individual pieces could be at a considerable cost to the consumer.

The invention addresses each of the above-mentioned problems in a practical fashion. It also satisfies a long-felt but unresolved need to provide knot tying hardware in a practical manner. To the extent that conventional knot tying systems provide only pictures of hardware the person of ordinary skill in the art was lead away from the solutions of this invention.

SUMMARY OF THE INVENTION

Accordingly, the broad object of the invention is to provide a knot tying system which provides a knot tie device for use with knot tying literature. In doing so, we achieve a goal of providing the consumer with a visual and physical aid to learn knot tying which may be used with literature which may be provided with the invention or with existing literature on knot tying, such as the above-mentioned knot tying references, books, or articles.

Another broad object of the invention can be to provide a knot tie contiguity. Thus an aspect of this object can be to provide the following hardware in one integrated design: a line cleat, rope loop, strap loop, knob, eyelet, open/closed "S" hook, tie down hook, ring, toggle, pole, tent stake, and fishing hook. Thus the goal of solving the issue of hardware, as above-mentioned can be accomplished in this multi-hardware tool.

Another broad object of the invention can be to provide a knot tie device or knot tie body having multiple tying material features so that the knotting tool may be used with various types, sizes, or shapes of knot material(s).

Another broad object of the invention can be to provide a knotting tool having different types of hold down elements, such as a portable mounting strap or the mounting bracket. This includes the goal of allowing flexibility in the way the invention may be used by the consumer.

Another broad object of the invention can be to provide a knot tie device that, either mounted or unmounted, can be portable.

Yet another goal is to provide an economical solution to obtaining the hardware necessary for knot teaching, tying, and developing.

Naturally, further objects of the invention are disclosed throughout other areas of the specification and claims.

DETAILED DESCRIPTION OF THE PREFERRED EMBODIMENTS

Knot tie devices and methods to use such knot tie devices, including the development and tying of knots, which can be used in numerous applications, including, but not limited to, teaching and hardware applications.

Figure 1:
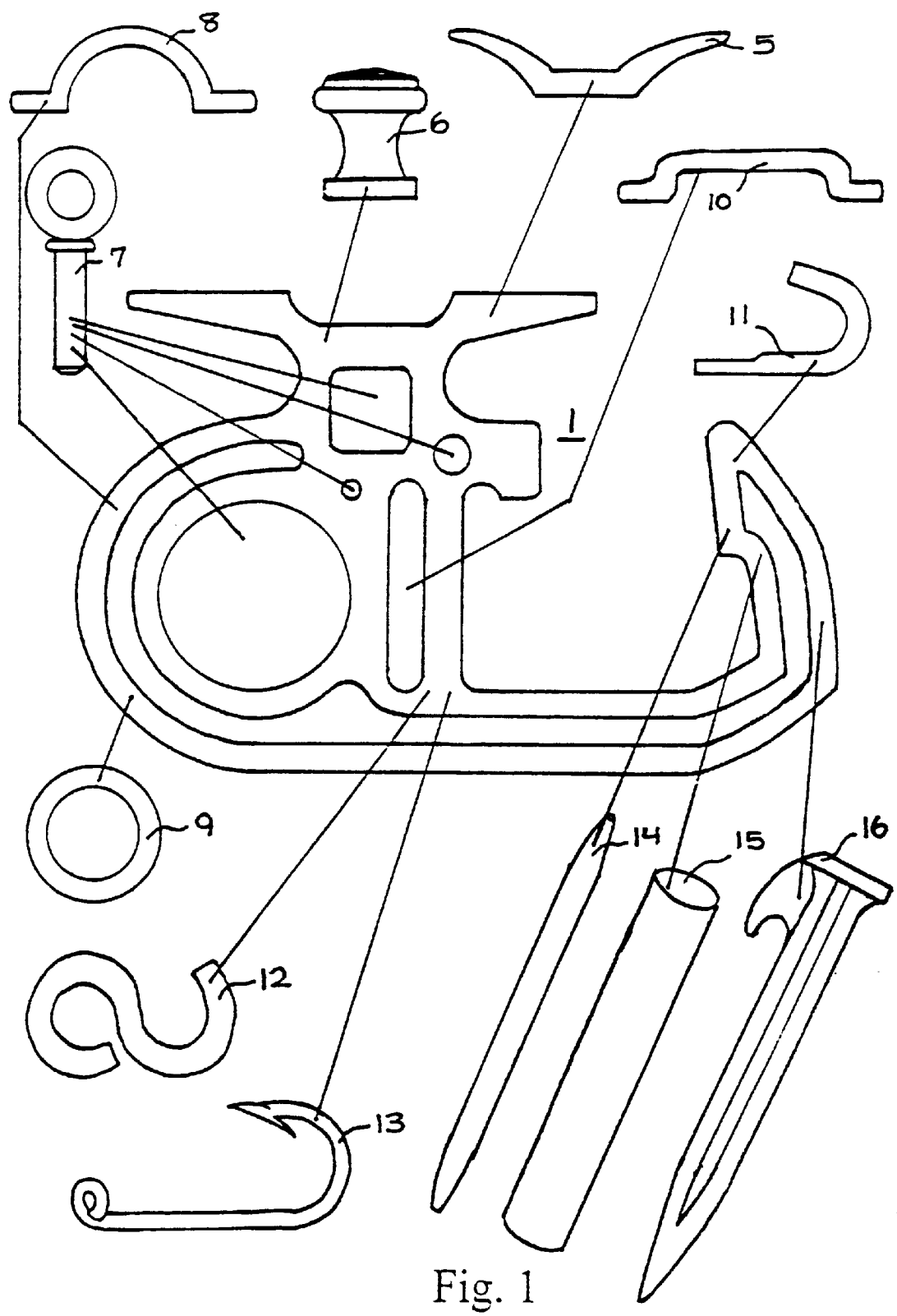
FIG. 1 shows a preferred embodiment of the invention having twelve knot tie elements integrated.
Figure 2:
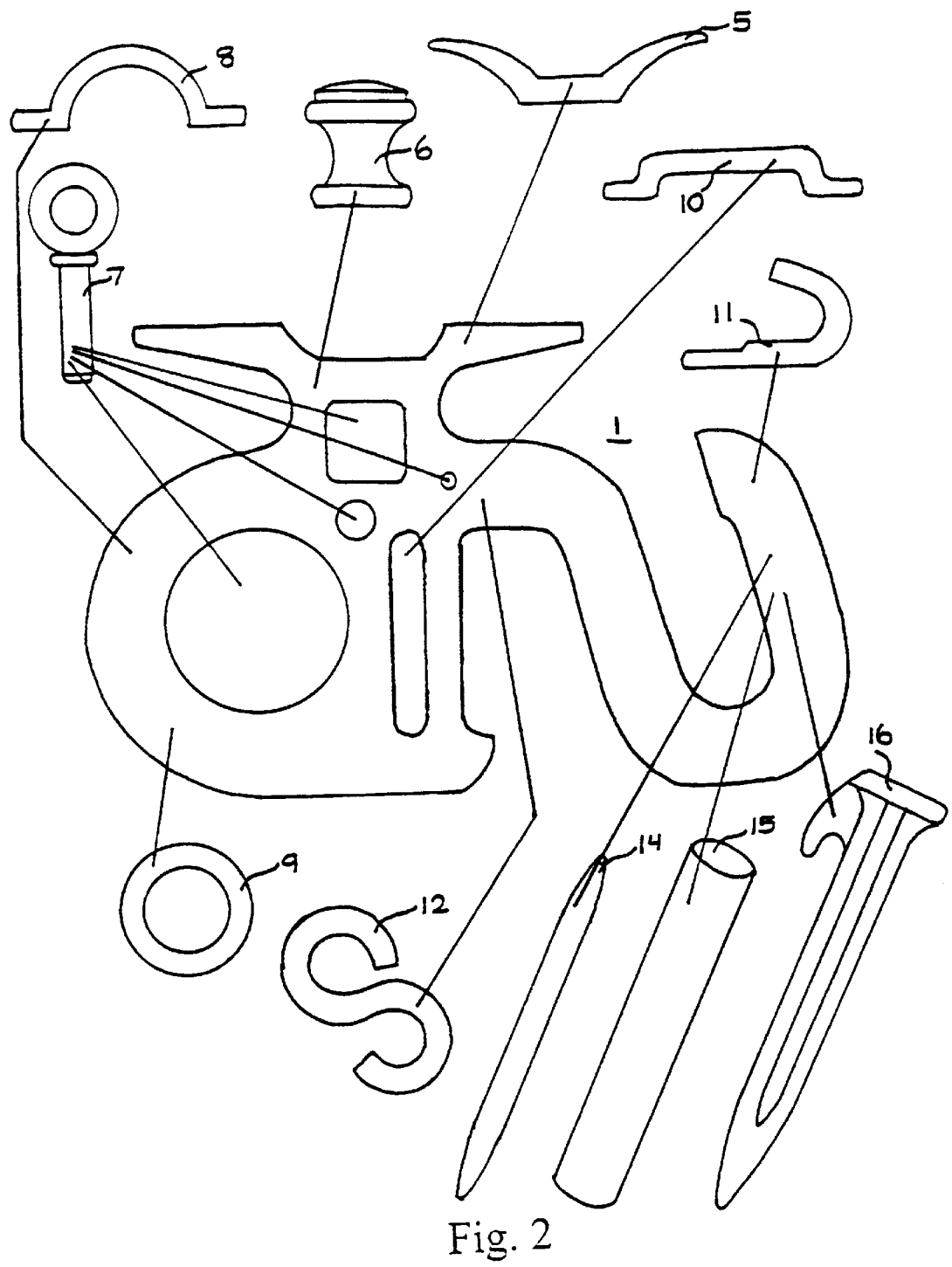
FIG. 2 shows another embodiment of the invention having eleven knot tie elements integrated.
Figure 3:
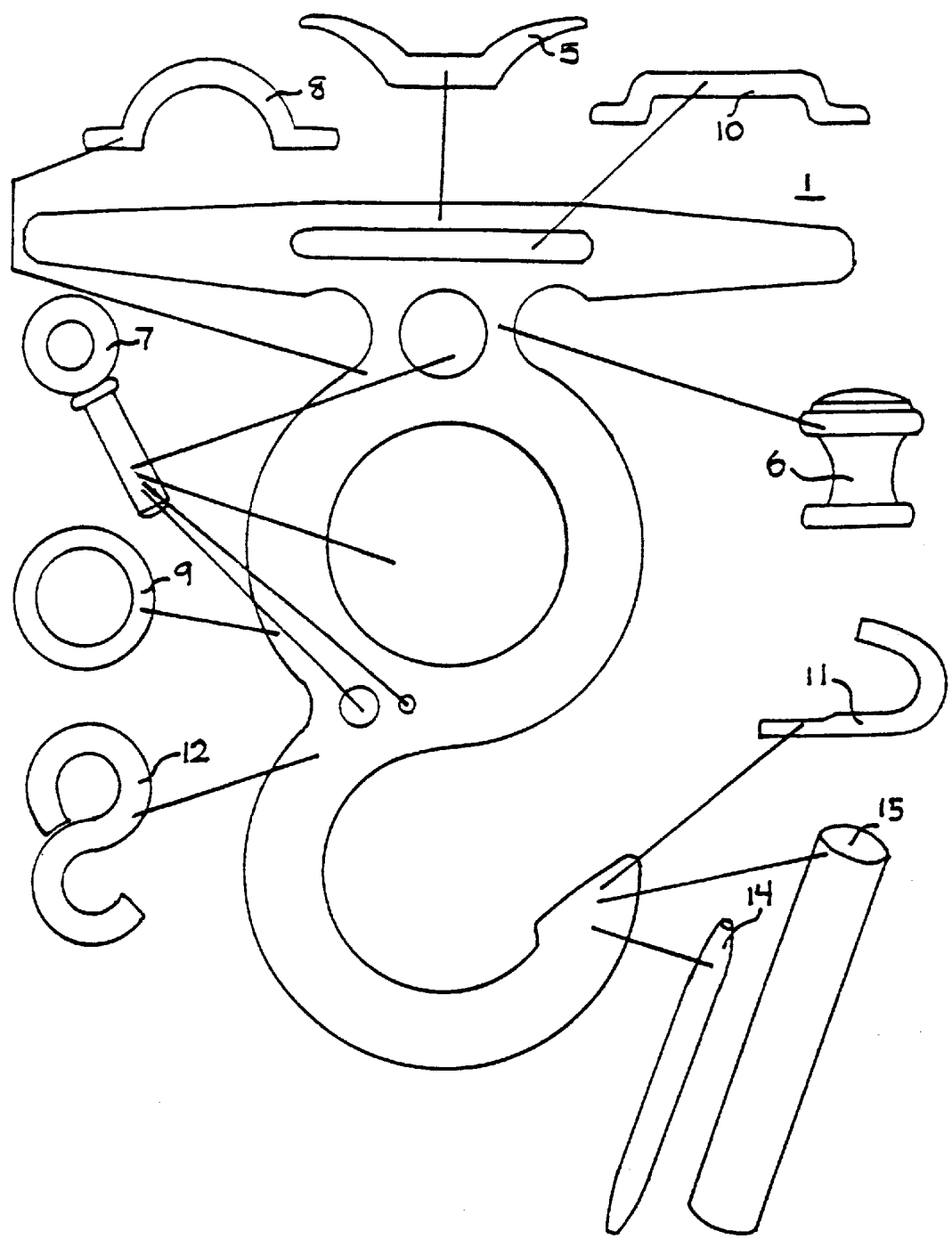
FIG. 3 shows another embodiment of the invention having ten knot tie elements integrated.
Figure 4:
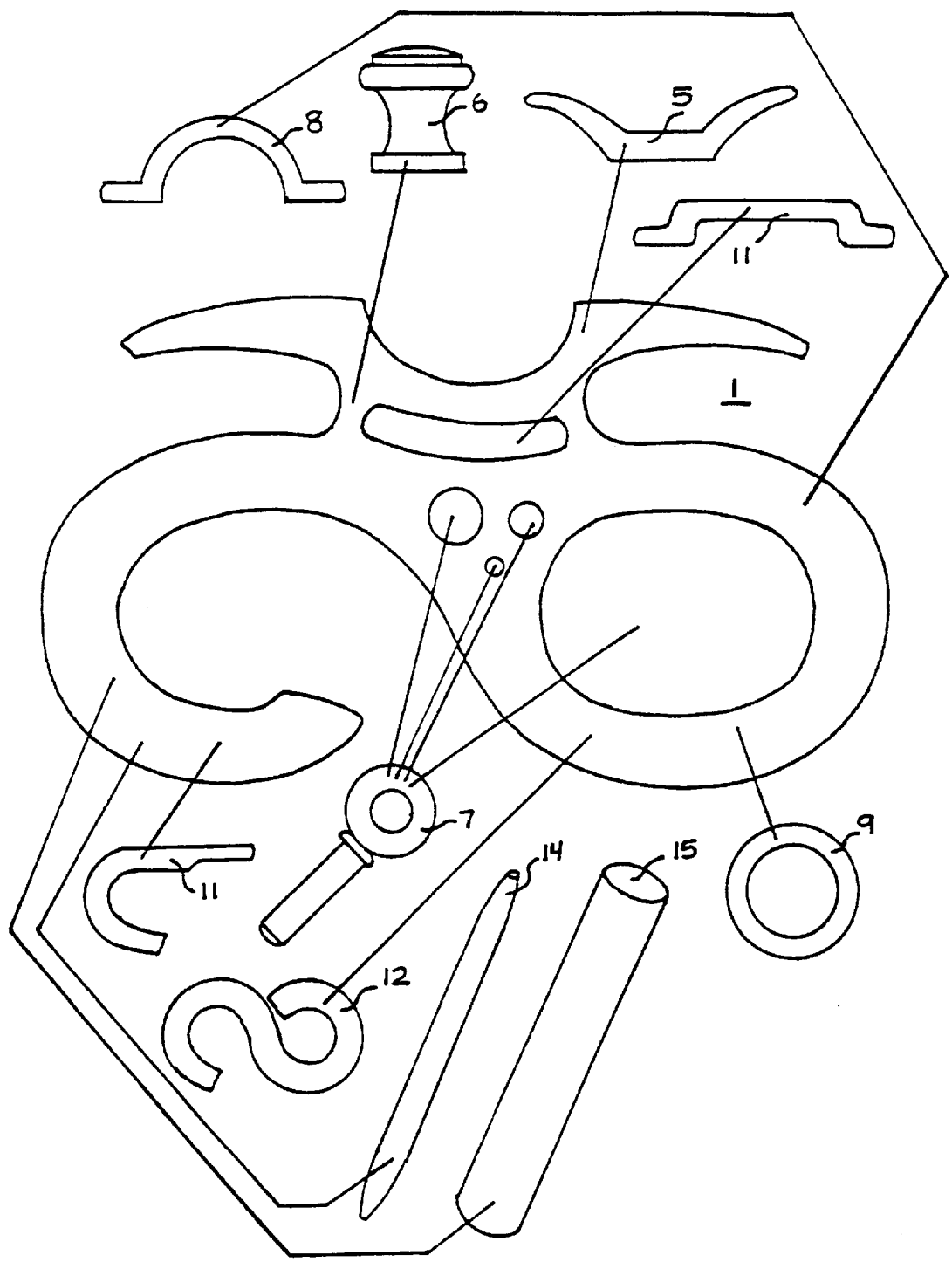
FIG. 4 shows another embodiment of the invention having ten knot tie elements integrated.
Figure 5:
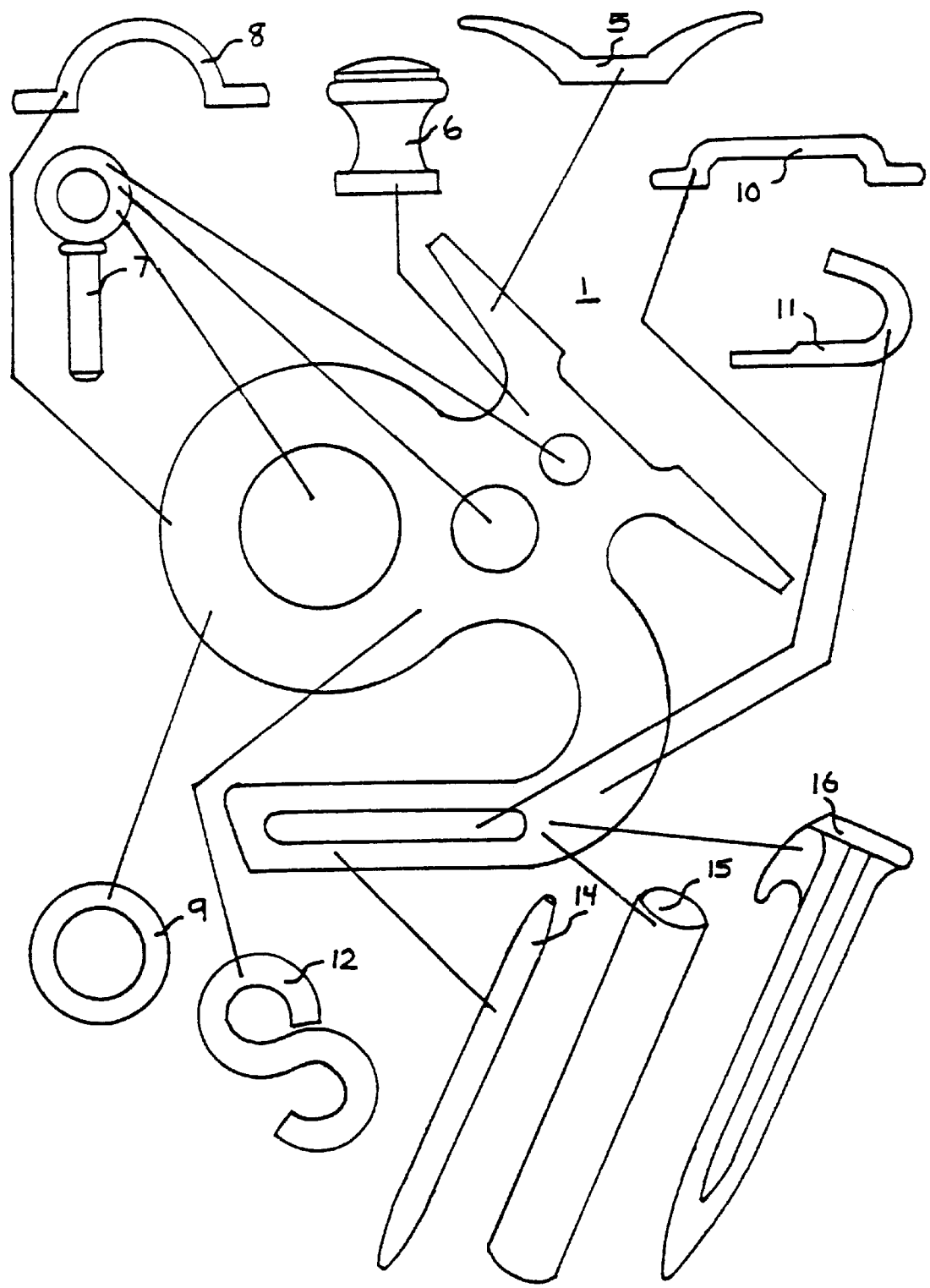
FIG. 5 shows another embodiment of the invention having eleven knot tie elements integrated.
Figure 6:
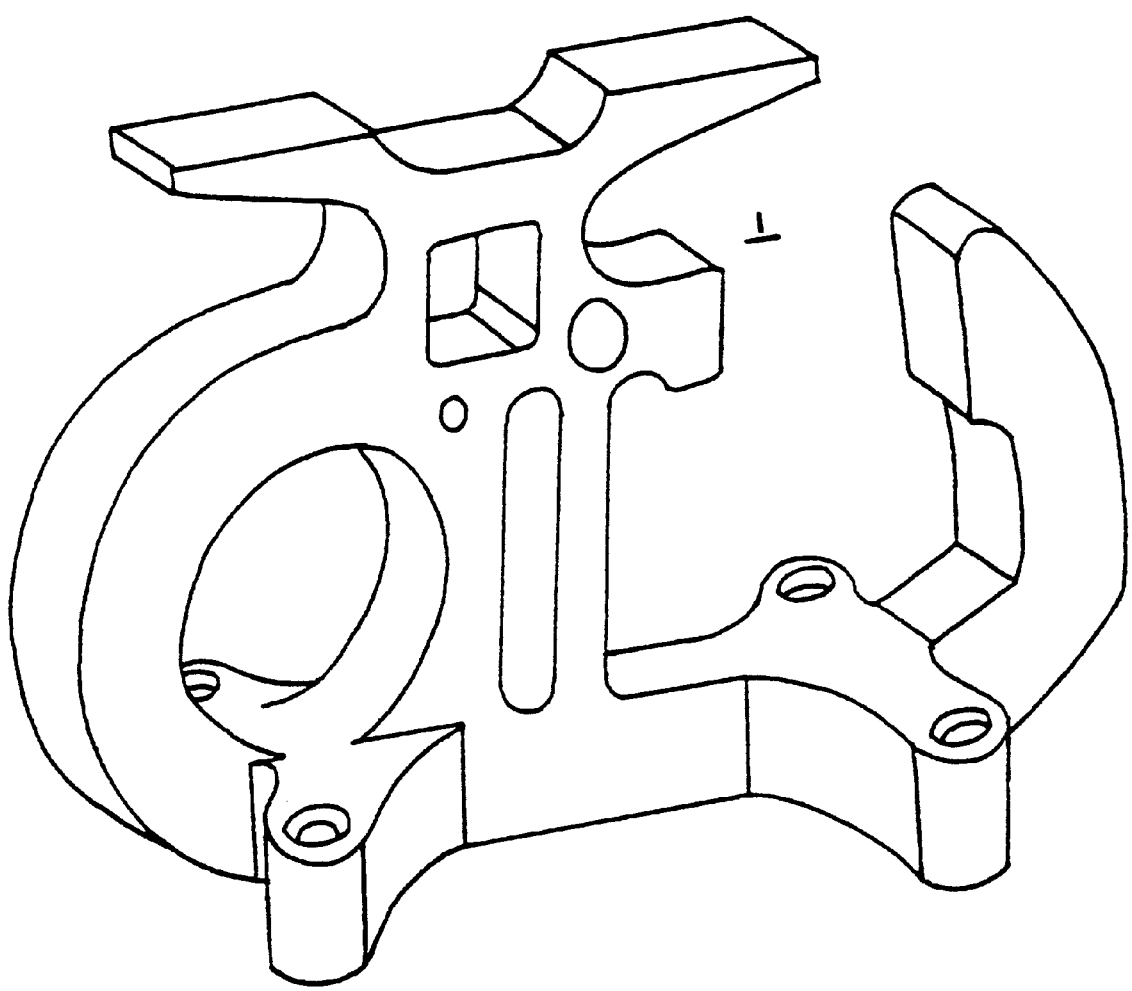
FIG. 6 shows an embodiment of the invention having a representative knot tie device hold down.
Figure 7:
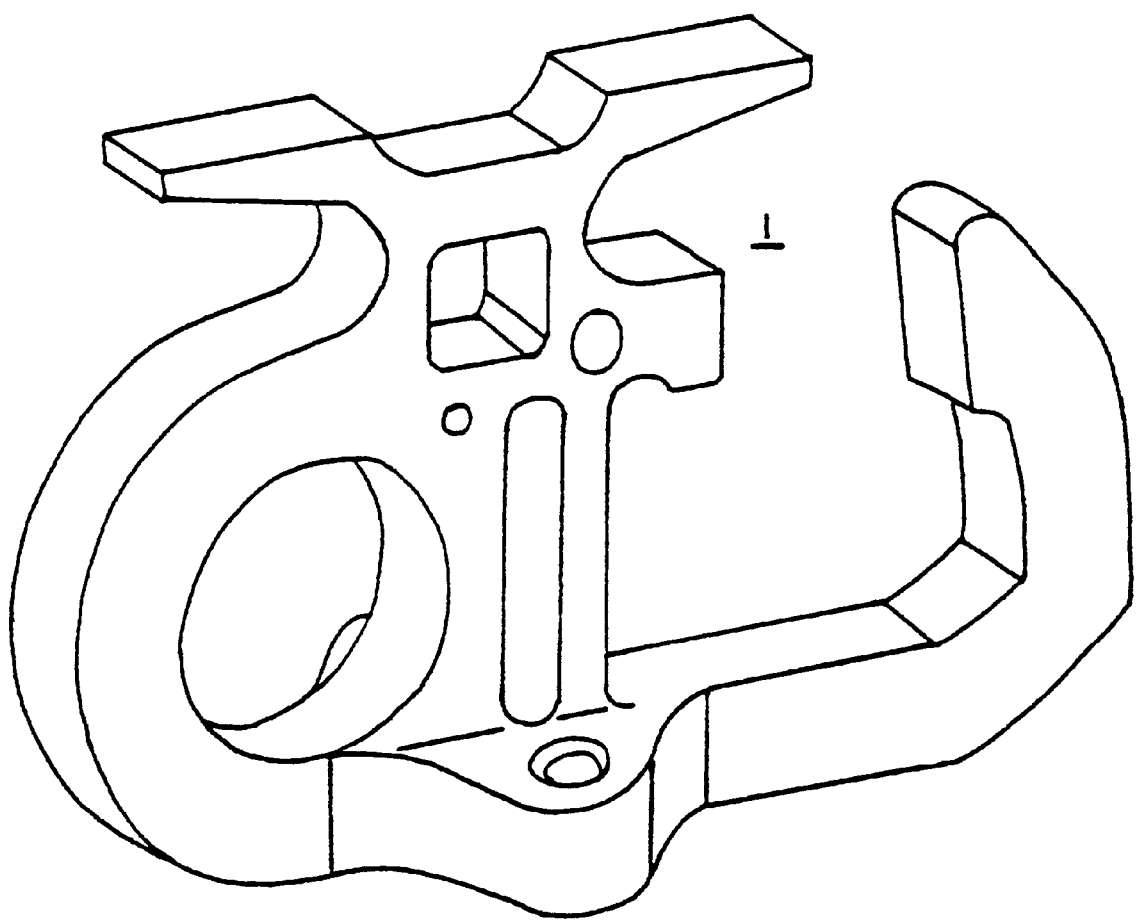
FIG. 7 shows an embodiment of the invention having a different type of representative knot tie device hold down.

In discussing these aspects of the invention some references may be made to various types of knot tie elements such as: a line cleat, a rope loop, a strap loop, a knob, an eyelet, an open/closed "S" hook, a tie down hook, a ring, a toggle, a pole, a tent stake, and a fishing hook. Representations of these types of knot tie elements are also shown as elements in the figures. These representations of knot tie elements are understood to encompass the wide variety of hardware of the general type described or represented and is not intended to limit the invention to any particular model or specific type. For example, the representation of the fish hook (13) in FIG. 1 is intended to be representative of hardware having this general shape, it is not intended to limit the invention to the fish hook shown, or a fish hook having any particular size, weight, barb, eyelet, or the like.

Figure 8:
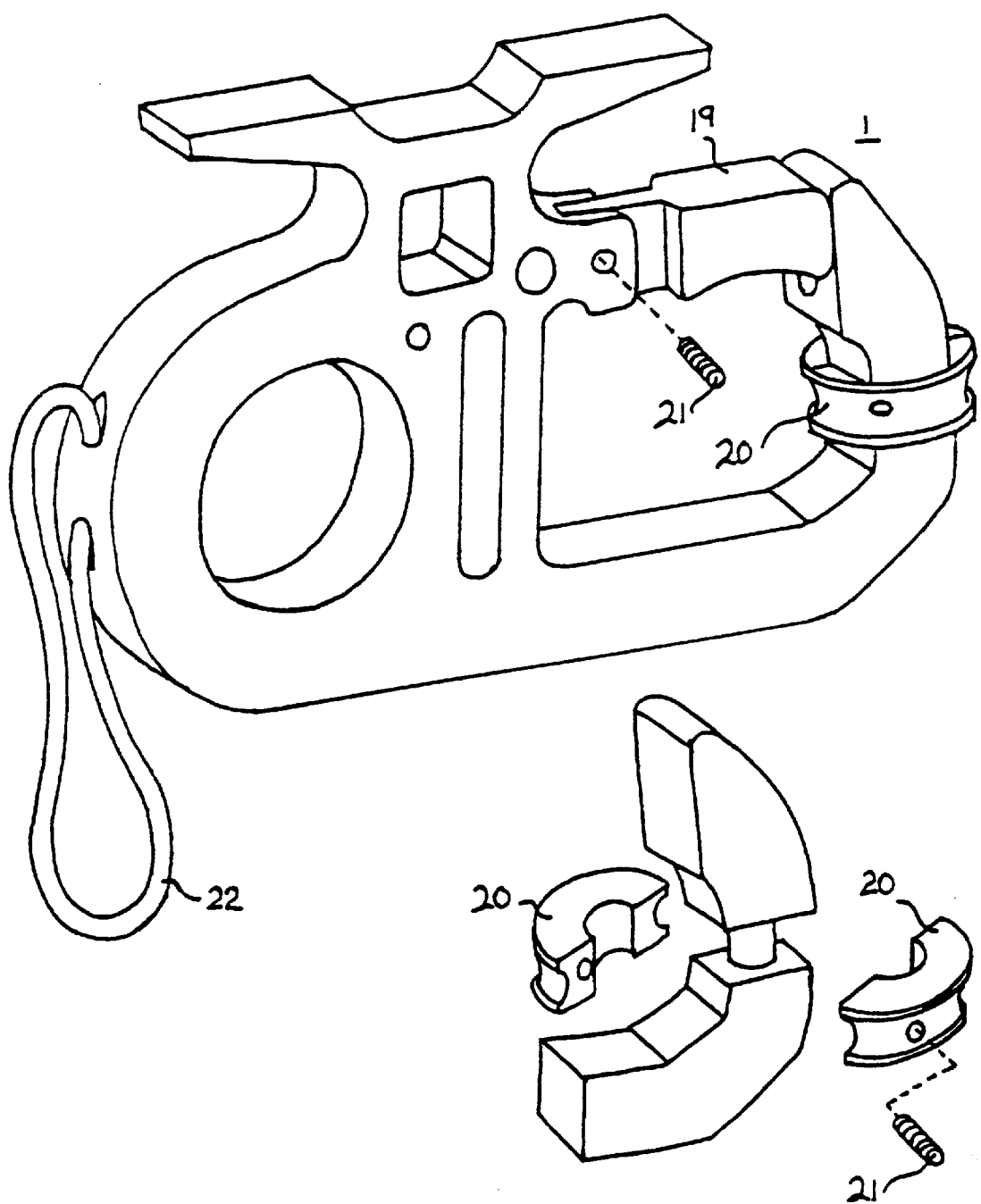
FIG. 8 shows an embodiment of the invention having a spring gate, two piece pulley wheel, and a lanyard.

Now referring to FIGS. 1–7, a knot tie device can comprise the integration of multiple types of knot tie elements, such as those shown, into a knot tie contiguity (1). As can be understood from FIGS. 1–7, the separate types of knot tie elements (5)–(16) can be integrated into the various embodiments of the knot tie contiguity. For example, twelve types of knot tie elements are integrated in the embodiment of the invention shown by FIG. 1, eleven types of knot tie elements are integrated in the embodiment of the invention shown by FIG. 2, while ten types of knot tie elements are integrated in the embodiment of the invention shown by FIGS. 3, 4, or 5. Naturally, other embodiments of the invention can integrate more or fewer knot tie elements. For example, in FIG. 8, the embodiment of the invention further comprises knot tie elements representing a spring gate (19), a two piece pulley wheel (21)(20), and a lanyard (22), which could be included individually or in combination with the knot tie elements shown in FIGS. 1–7. Common to each embodiment of the invention can be that the knot tie contiguity allows an individual to use each of the knot tie elements to teach, develop, or tie knots even though each knot tie element is integrated with the other knot tie elements into the knot tie contiguity. Note that FIGS. 1–7, are representative in general of the types of embodiments of the invention which can be made and maintain the functionality of the separate knot tie elements even though they are integrated into a single knot tie contiguity. As such, it can be understood that numerous embodiments of the invention, and specifically knot tie contiguities, are possible but not shown by the various figures.

Figure 17:
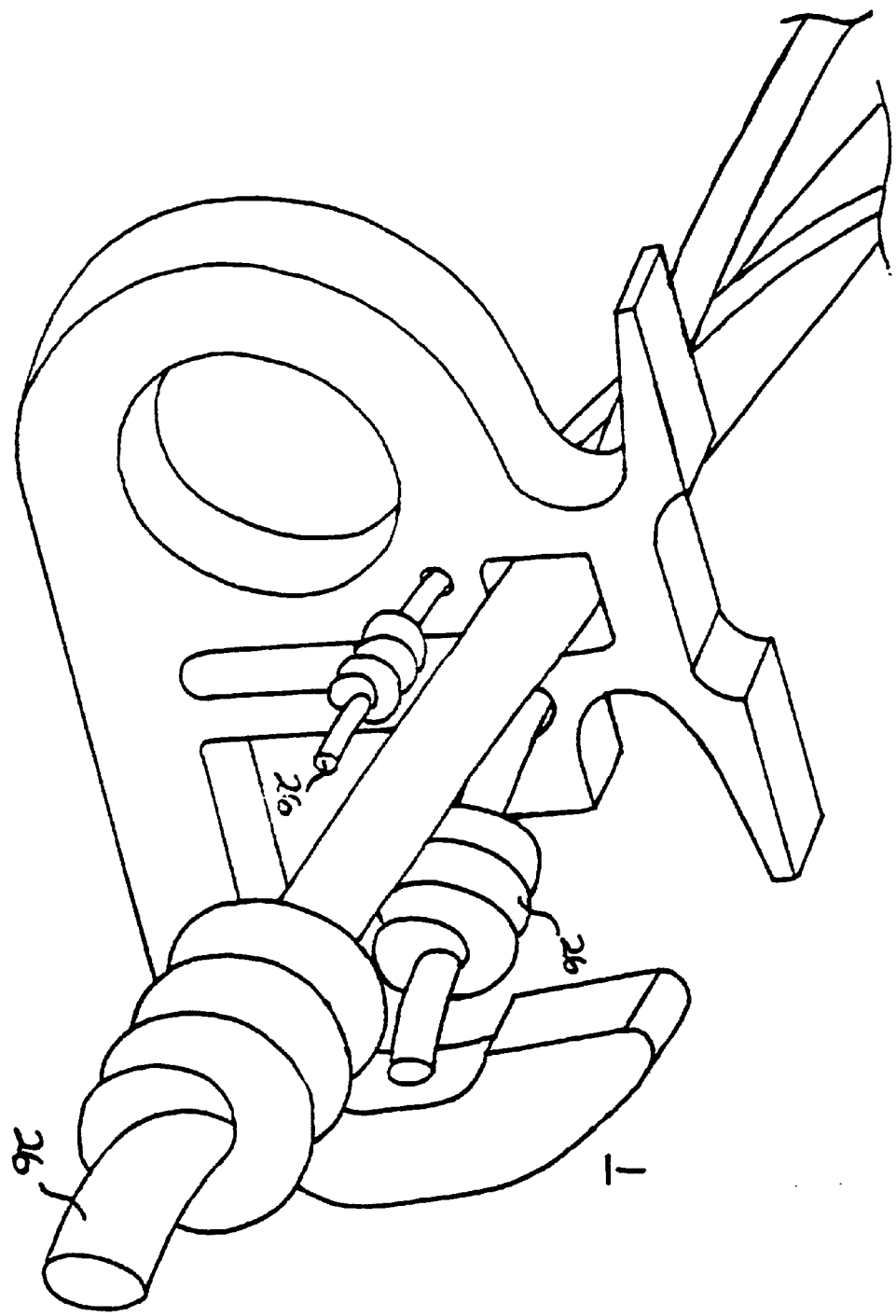
FIG. 17 shows an embodiment of the invention having a multiple knot material differentiation element to tie multiple sizes of ropes going through the eyelets.
Figure 18:
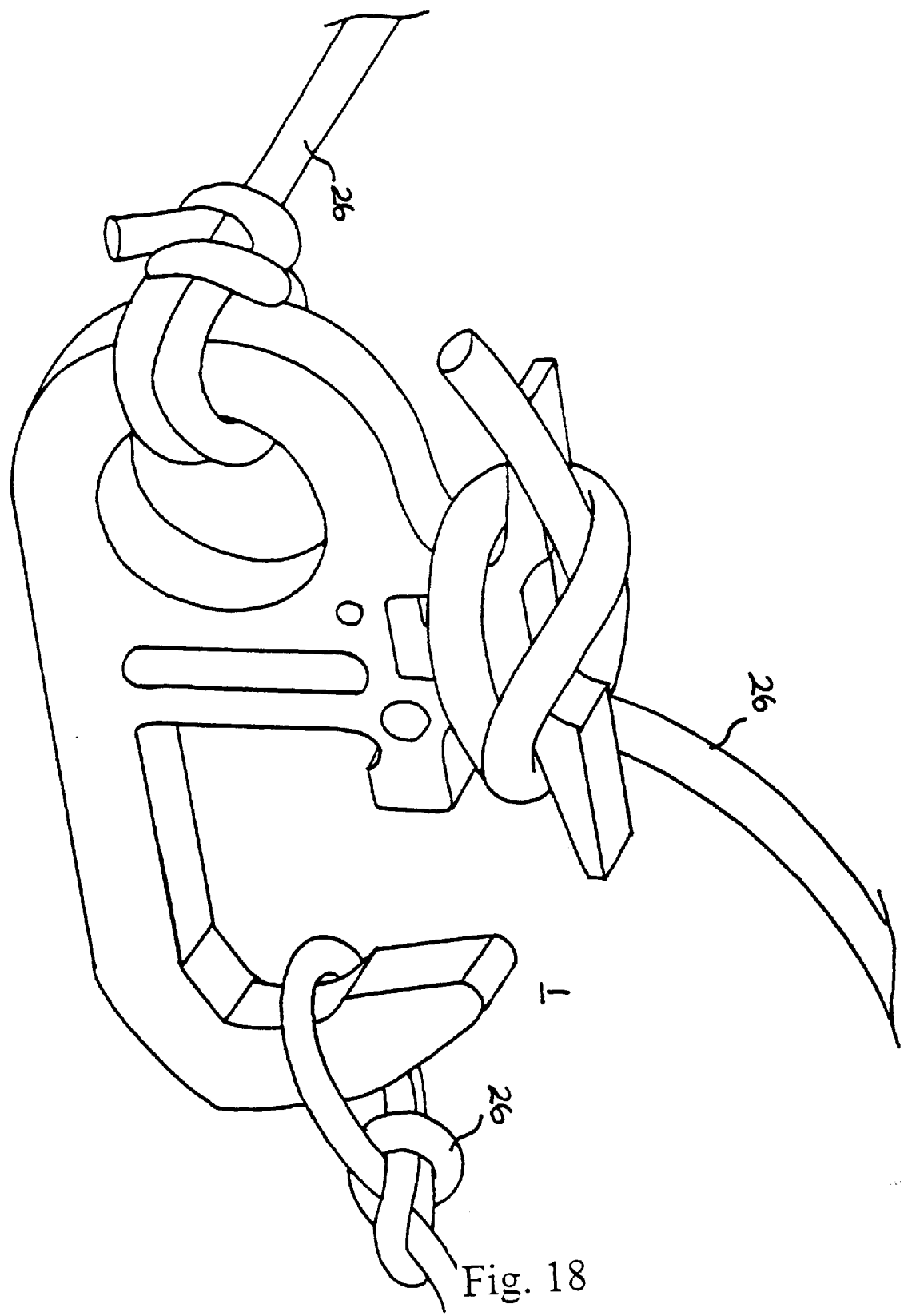
FIG. 18 shows an embodiment of the invention being used for a particular knot tying application.
Figure 19:
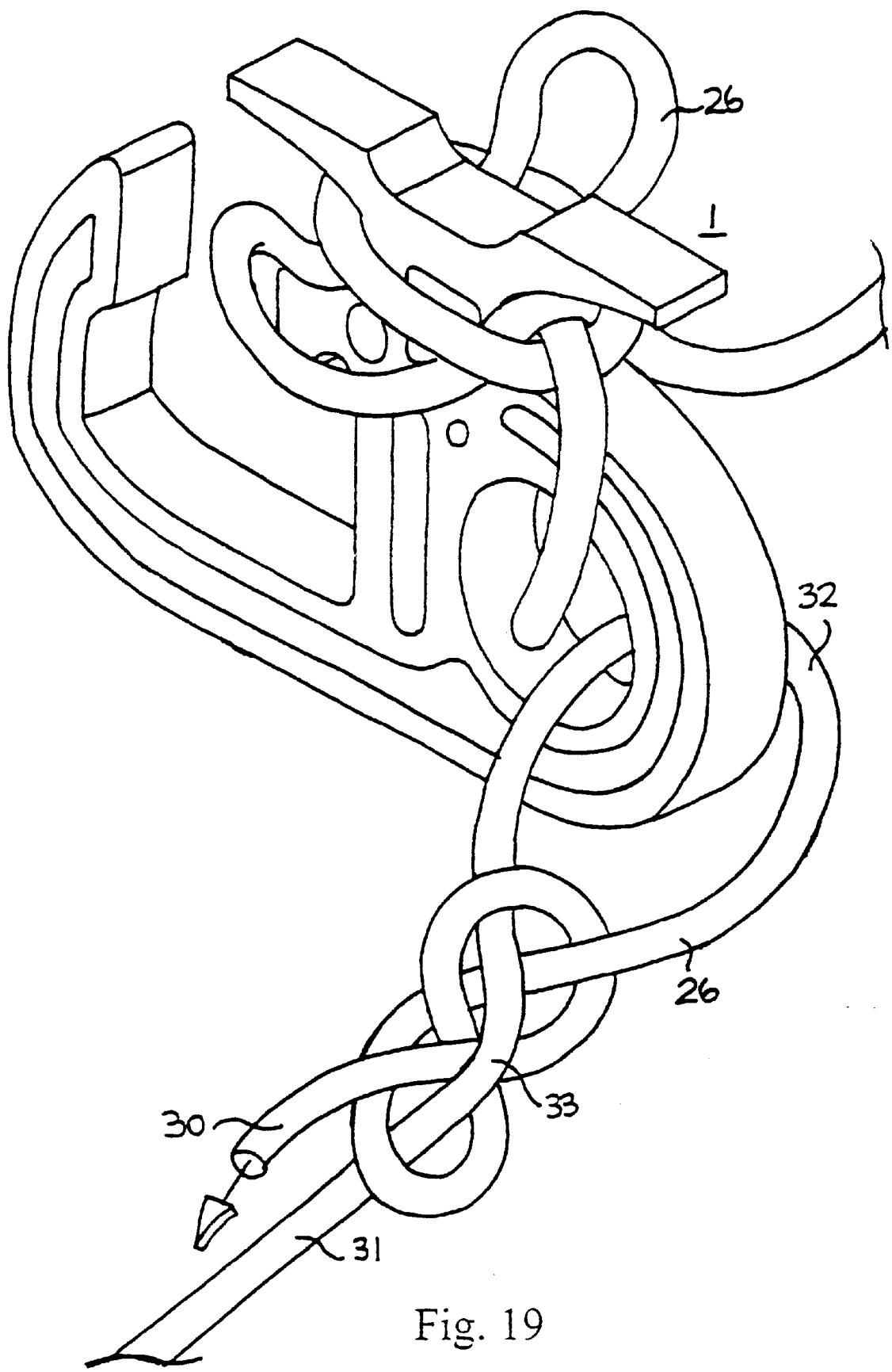
FIG. 19 shows an embodiment of the invention being used to tie the "Lusk" knot.
Figure 20:
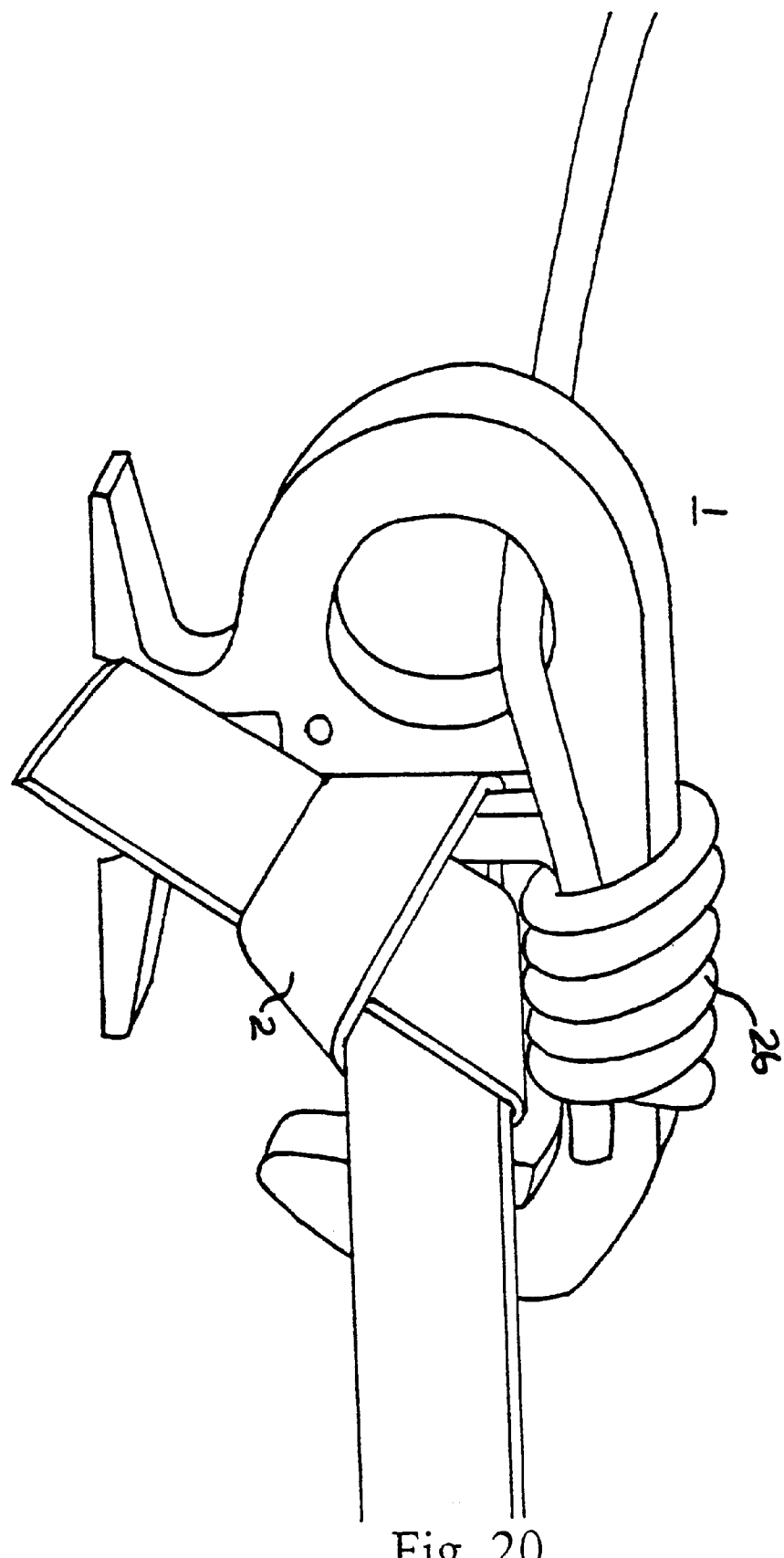
FIG. 20 shows an embodiment of the invention being used with a strap through the strap loop and a rope around the fishing hook section.

Specifically, the knot tie contiguity (1) can include, in various combinations, a line cleat (5) of an appropriate size for learning or functional use, such as shown in use by FIG. 18. The knob (6) may be used for practicing tying knots for bottle necks and other similar objects, as shown by FIG. 19. The large, medium, and small eyelet's (7) as shown in use by FIG. 17 can be used with many different sized knot materials. This gives the user the added dimension of learning to tie with various sized ropes, for example. The rope loop (8) and ring (9) are represented in the circular area as shown being used in FIGS. 18 and 19 and can be of an appropriate size to use in practical application. The strap loop (10) shown being used by FIG. 20 provides the knot tie contiguity (1) with another added dimension of learning to tie knots with a strap and not only a rope. The "S" hook function is physically representative of an open/closed "S" hook (12) as shown being used by FIG. 18 can be of an appropriate size for practical application. The fishing hook (13) can be used as shown by FIG. 20 (the ring and bottom part of the tool). The tie down hook (11) as shown in use by FIG. 18 can be of an appropriate size to use in practical application or for learning. The toggle (14), pole (15), and tent stake (16) function(s) can be fulfilled in the straight open section as shown by FIG. 18. This open end allows the consumer to practice knots that could be tied around a pole or tent stake as well as provide them with a functional toggle. FIGS. 2 through 8 show several alternate knot tie contiguity (1) designs. It should be understood from the above discussion that not all knot tie devices include a knot tie contiguity but rather can simply employ a knot tie body that does not include knot tie elements joined in a manner that comprises a knot tie contiguity as discussed above.

One example of how to tie onto the ring section (9) of the knot tie contiguity (1) as seen in FIG. 19 would be the following: begin by placing the stand part (31) of the knot material (26), such as a rope, in the left hand and the work end (30) in the right hand. Pass the work end (30) of the rope (26) through the ring (9) from left to right. Take the work end (30) underneath the stand part (31) forming an underhand loop from right to left (the cross-under is the area where the ropes cross). Pinch this area with your left hand, using your thumb and pointing finger. Place the middle finger of the left hand next to the cross-under on the open side, not the loop (32) side. Loosely wrap the work end (30) around the middle finger and then crossover the stand part (31) from left to right. This forms a half-loop (33) 180 degrees forming a slight arc in the rope from the cross-under to the crossover point. Feed the work end (30) upwards in between the pinched point and the middle finger from right to left. Feed the work end (30) through the underhand loop made earlier around the ring (9) from left to right and from top to bottom. Feed the work end (30) by crossing under the half-loop (33), see FIG. 19, on the stand part (31) from right to left. (Be sure the work end (33) only goes under the stand part). Then pull the work end (30) while letting go with the left hand. The final step is to adjust the knot tightly against the stand part (31).

Figure 9:
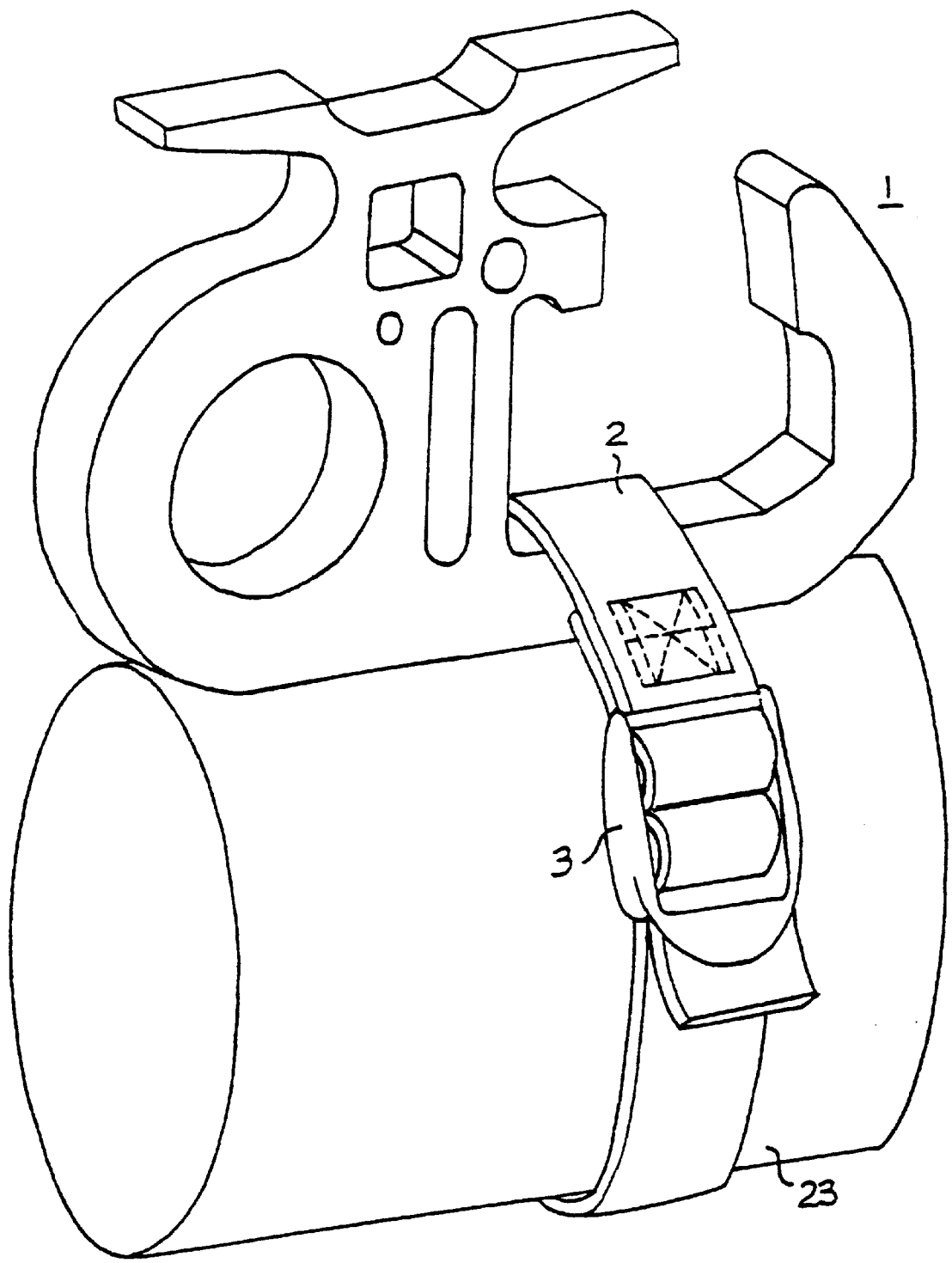
FIG. 9 shows an embodiment of the invention having a hold down that operates to secured the invention to a person's leg, or a log, or other object with a mounting strap.
Figure 10:
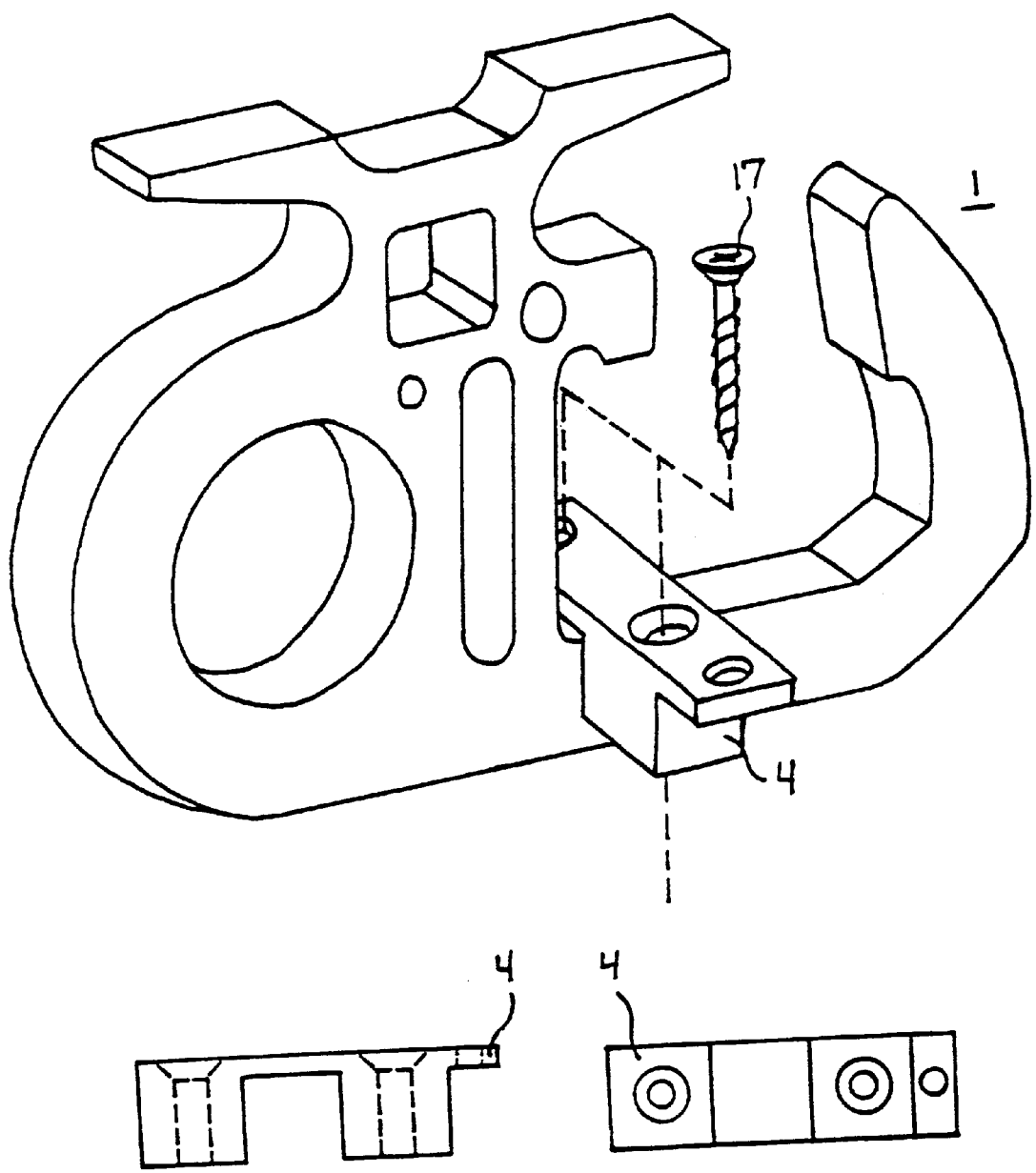
FIG. 10 shows an embodiment of the invention having a representative knot tie device hold down.
Figure 11:
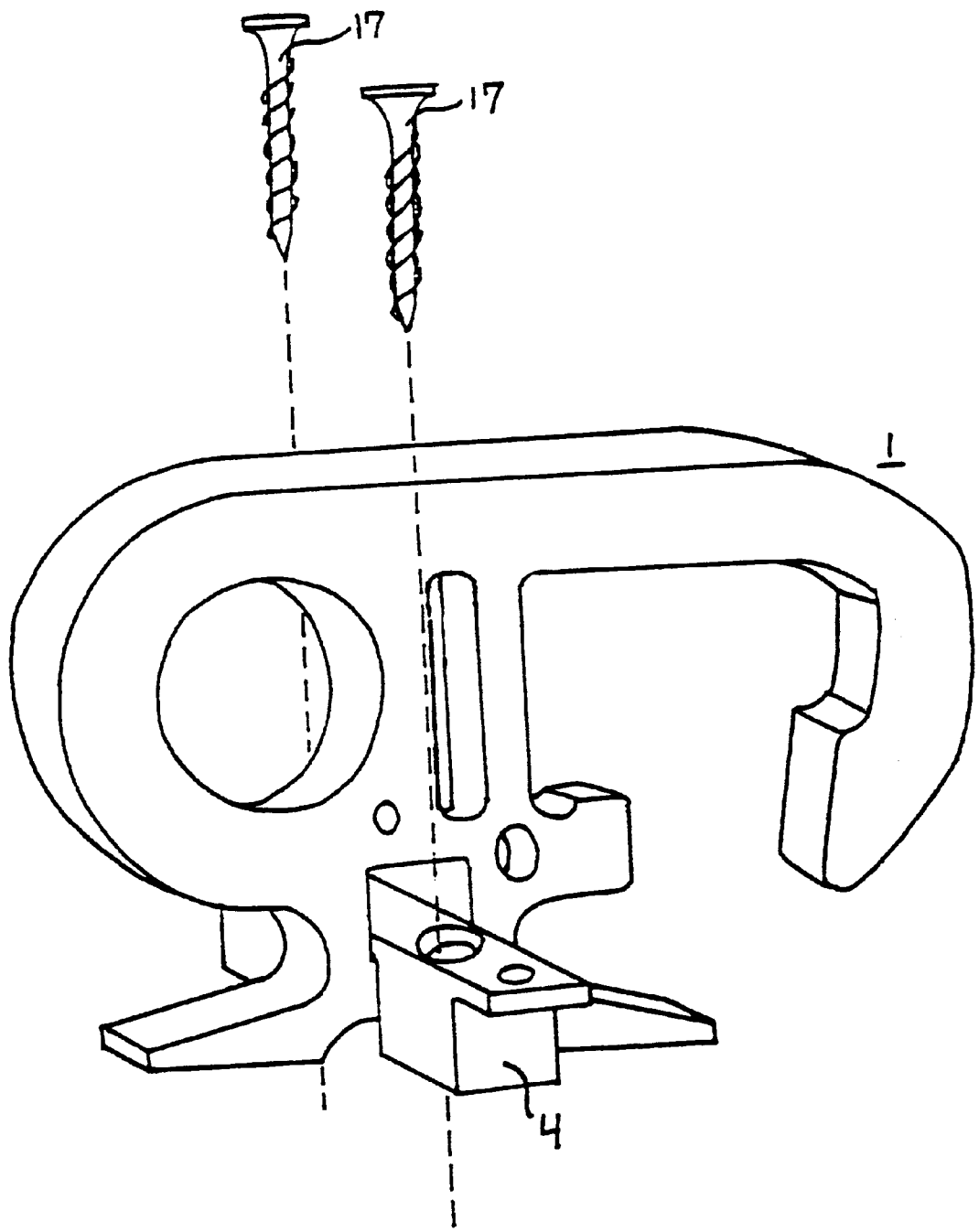
FIG. 11 shows an embodiment of the invention having a representative knot tie device hold down
Figure 12:
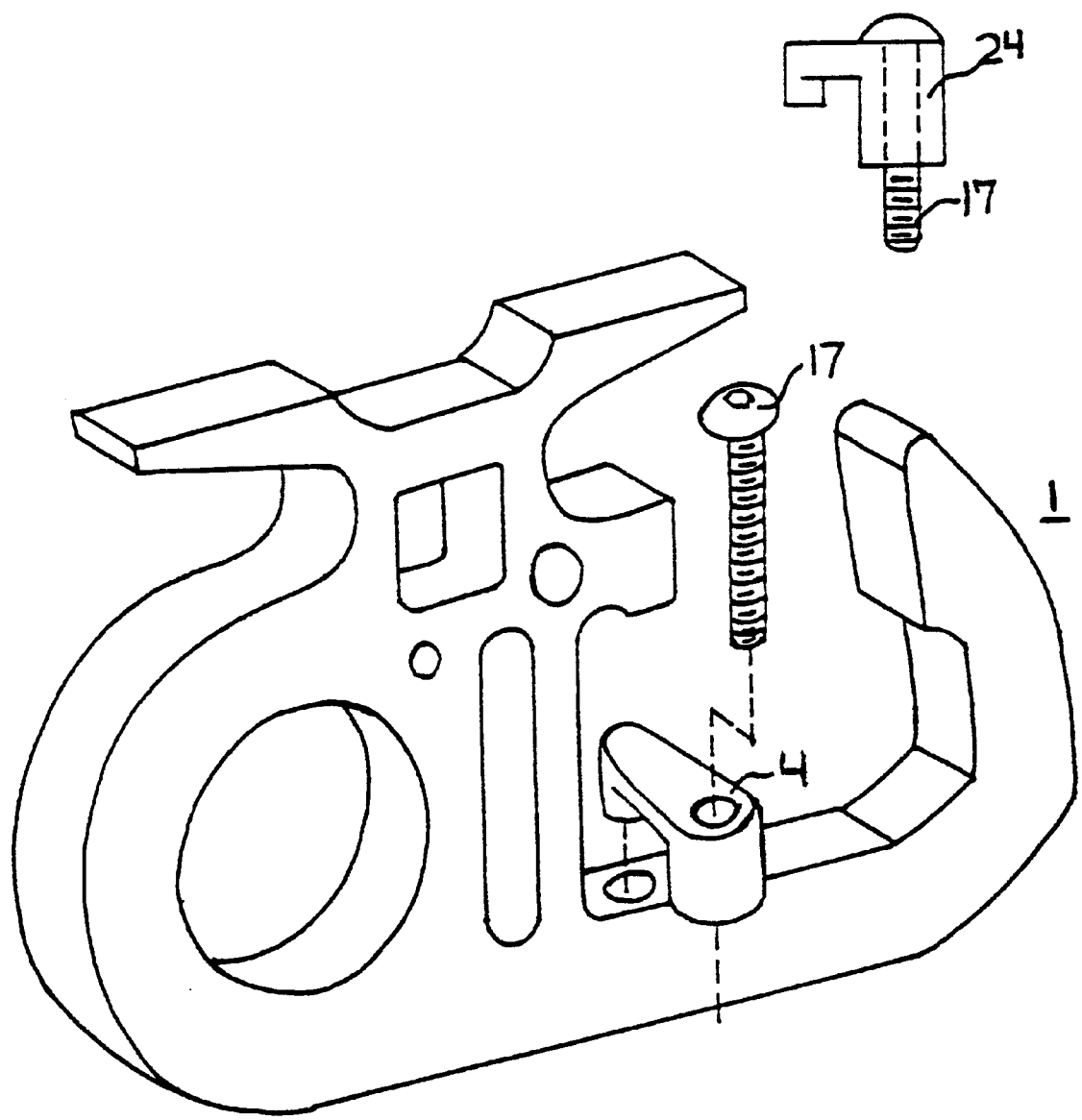
FIG. 12 shows an embodiment of the invention having with an alternate knot tie device hold down.
Figure 13:
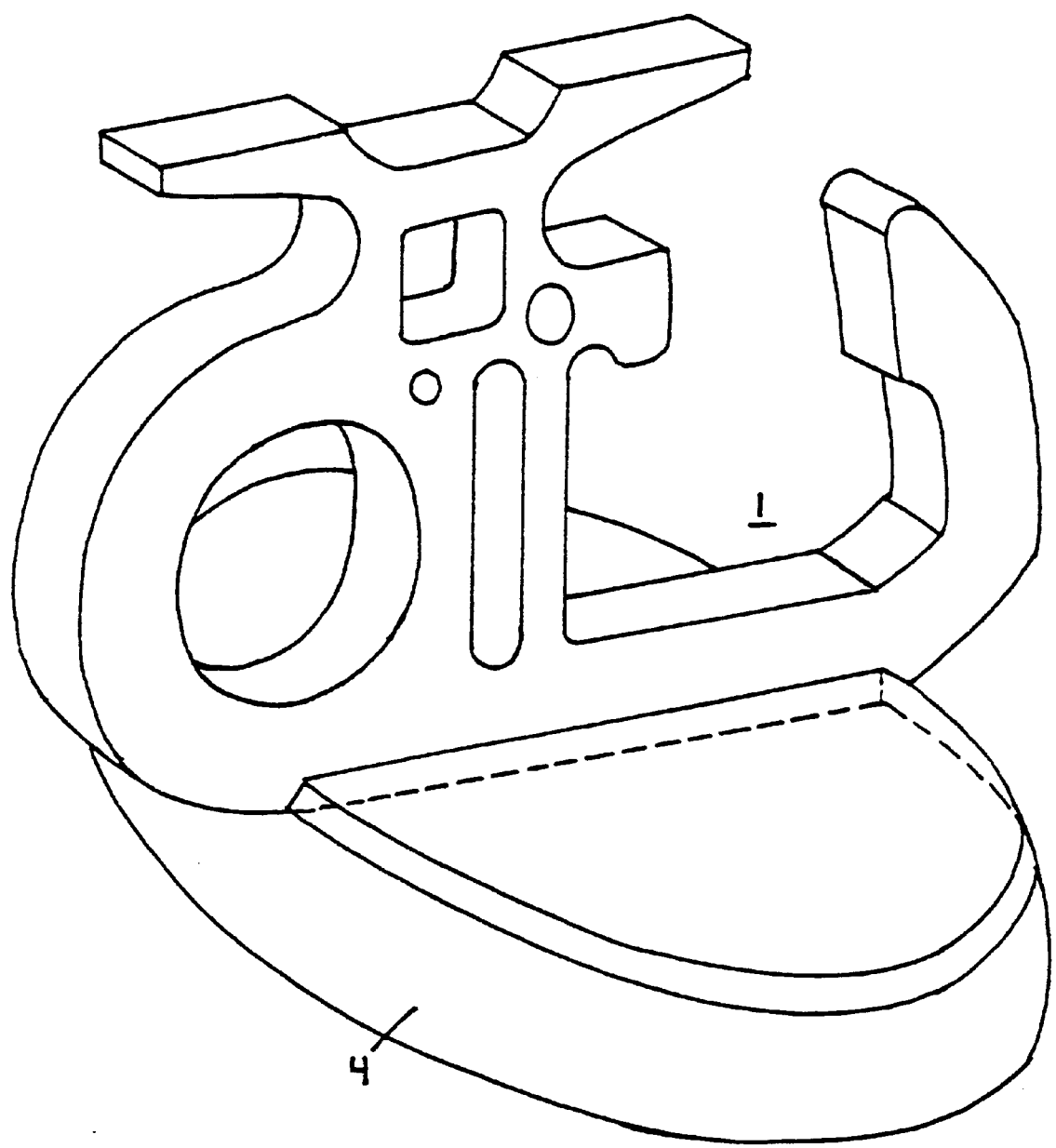
FIG. 13 shows an embodiment of the invention having an alternate knot tie device hold down.
Figure 14:
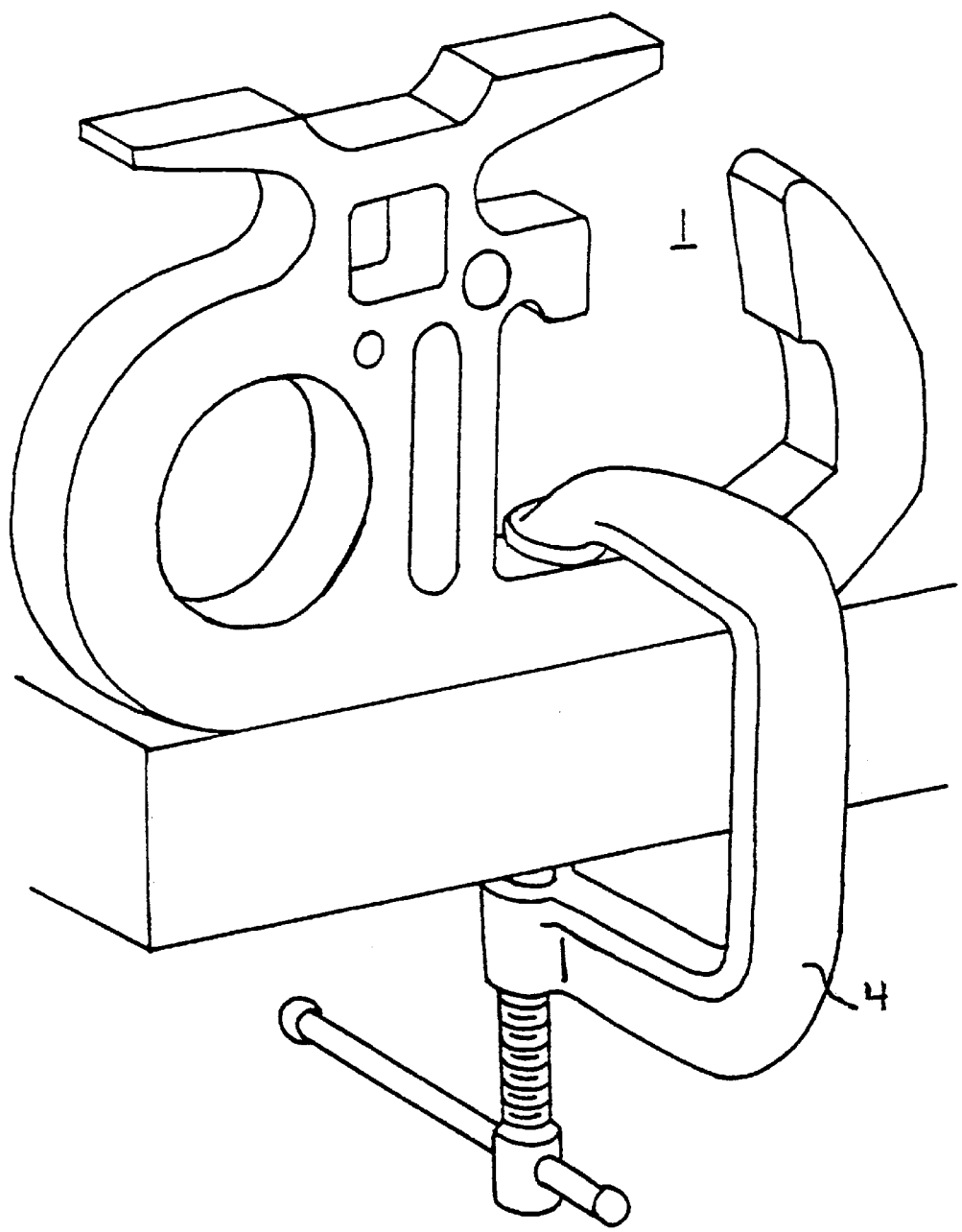
FIG. 14 shows an embodiment of the invention having an alternate knot tie device hold down.
Figure 15:
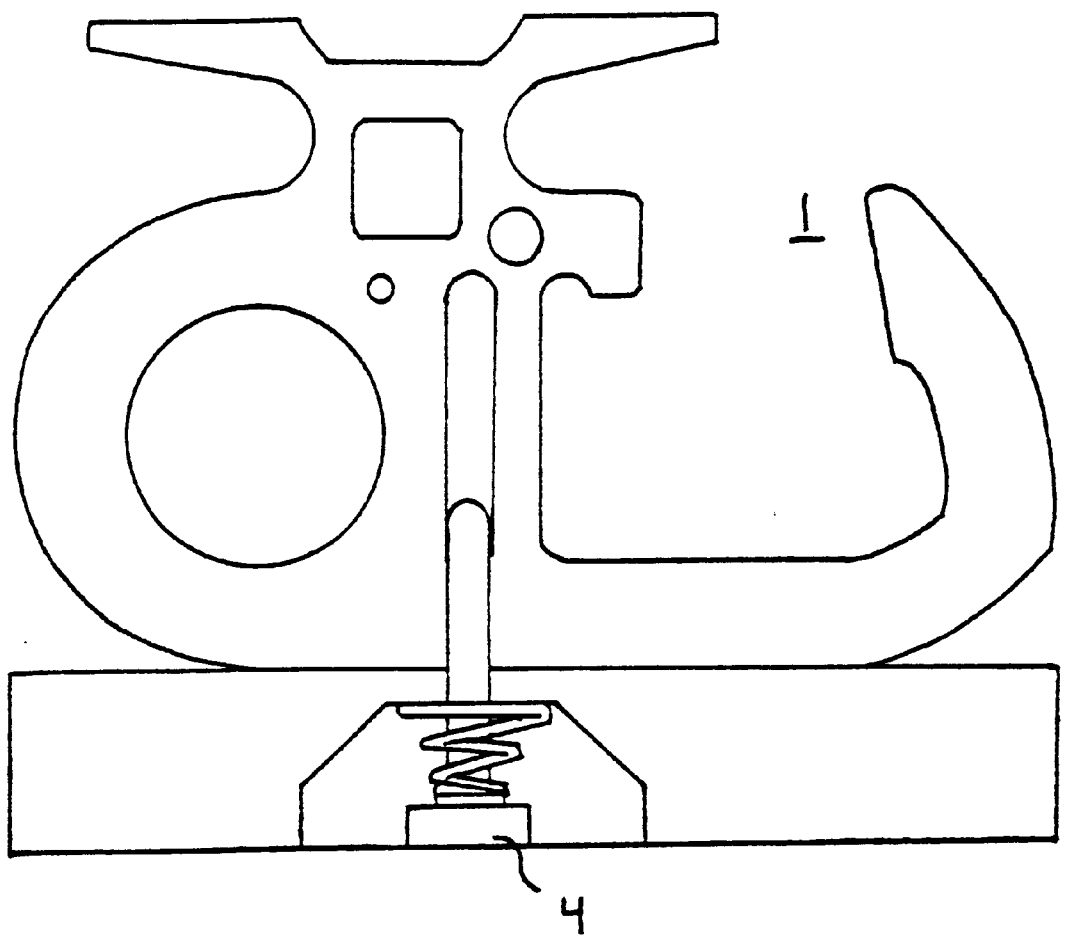
FIG. 15 shows an embodiment of the invention having an alternate knot tie device hold down.
Figure 16:
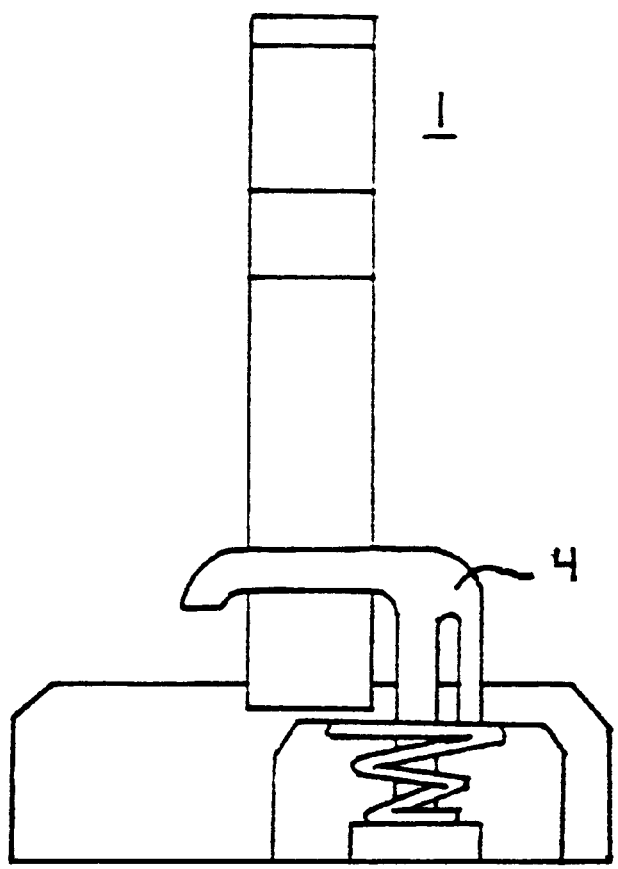
FIG. 16 shows a cross section of the embodiment of the invention with the alternate knot tie device hold shown by FIG. 15.

The knot tie contiguity (1) can further comprise a knot tie contiguity hold down (2) which can be embodied as a portable mounting strap (2) as shown by FIG. 9, or as a mounting bracket (4) as shown by FIG. 10, 11, 12, 14, or 15, as examples. This results in three ways to mount and use the knot tie contiguity (1). First, the knot tie contiguity (1) can be mounted with the strap (2) as shown in FIG. 9 to a person's leg or a log (23), for example. This application can work best when the knotting tool is used for teaching/learning purposes. Second, the knot tie contiguity (1) may be mounted with the bracket (4) and screws (17) as seen in FIGS. 10 and 11. This allows the knot tie contiguity to be attached, for example, to a felled tree or another secure surface such as a workbench. This application highlights the uses of the eyelet (7), strap loop (10), rope loop (8), line cleat (5), tie down hook (11), tent stake (16), pole (15), knob (6), fishing hook (13), since this hardware may be used most efficiently when mounted/secured. Third, the knot tie contiguity (1) may be used alone as seen in FIG. 18. This application highlights the use of the open/closed "S" hook (12), ring (9), and toggle (14) since this hardware is used most efficiently when unmounted. These three options provide flexibility to the user by allowing them to choose the level of stability needed. FIGS. 12 through 16 show alternate hold down designs that may be used with the preferred integrated design or with the alternate integrated designs. Again, these hold down designs show that there are numerous ways to mount the knot tie contiguity (1) and it is understood that the hold down is not limited to the types represented by the Figures. Naturally, the hold down embodiments can be used with a more conventional knot tie body or device.

Other embodiments of the invention, as exemplified by FIG. 17, or knot tie body, can further comprise a knot material differentiation element. The knot material differentiation element comprises a hardware element such as a ring (9) to be repeated within the configuration of the knot tie contiguity (1), or knot tie body, so that different types of knotting material can be used. In the example provided by FIG. 17, the knot tie contiguity (1) includes various diameters of ring (9) to be incorporated into the embodiment of the invention. As such, various diameters of knot material can be used with the knot tie contiguity (1) so that the user can learn or develop knots using these various diameters of knot material, or use these various diameters of knot material when using the knot tie device in a hardware application.

Figure 21:
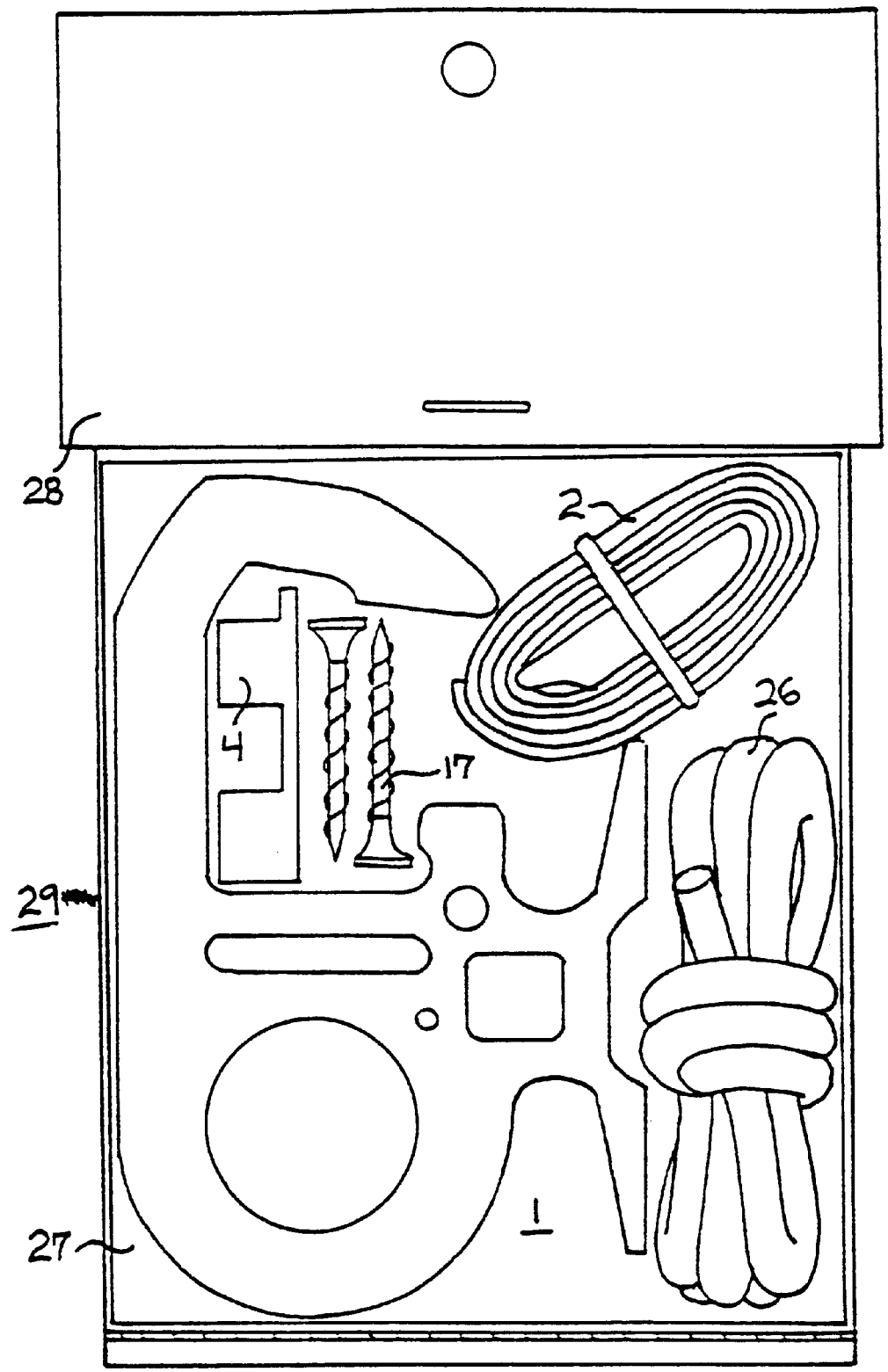
FIG. 21 shows an embodiment of the invention as a kit including a rope, a portable strap mount, a mounting bracket, screws, and an instruction booklet.

Now referring primarily to FIG. 21, an embodiment of the invention can comprise a kit including a rope (26), a portable strap mount (2), a mounting bracket (4), screws (17), and an instruction booklet (28).

It should be understood that, the knot tie contiguity (1) can be made from various materials with varying strengths to accomplish different tasks or functions. A strong material such as metal, ceramic, or shatter proof plastic could be used for the knot tie contiguity (1) when it is to be used for practical application purposes. It may be made out of a less strong material when it is to be used for teaching purposes, such as plastic, wood, or the like. The mounting bracket (4), such as the embodiments shown by FIGS. 7, 10, 11, 12, 13, 14, 15, or 16 may be made out of a different material than the knot tie contiguity (1), such as plastic. The flexibility and availability in choosing materials to manufacture the knot tie contiguity (1), along with its different hold down designs, may increase the chances that it will appeal to many customers.

One example of a process to make the knot tie contiguity (1) and mounting bracket (4) invention could be plastic injection molding. Accomplished using an injection molding machine, the first step in this process can be to start with a professional drawing of the object. This drawing can be drawn with a variety of software currently on the market that fits into the category of computer aided design/drafting. An accurate drawing is necessary to visually communicate everything about the knot tie device such as overall dimensions, tolerances, draft angles, types of materials, filleted edges, and any other necessary data about the object.

These professional drawings are given to a machinist that will machine a cold-runner two plate mold. Each plate mold represents one half of the knot tie device being injected molded. It can be molded this way because injection molded parts tend to stick in their molds and by designing molds that split down the center, which creates a parting line of the object, it is easier to remove. One side of the mold has ejector pins designed into it to aid in the ejection of the object from the mold. The other side has cooling tubes and fittings to water cool the mold. The center has a mold access hole designed into it for the melted plastic to enter the mold. Both sides of the plate molds have threaded mounting holes that allow them to be secured by bolts to the Injection Molding machine. The next step is to bring the two molds together which are mounted about two feet apart by the machines hydraulic press. The hopper is loaded with a thermoplastic material, such as polypropylene, that comes in a powder or a pellet form. The hopper feeds into a cylindrical barrel that has a large screw that rotates and reciprocates. The cylinder is heated and a measured volume of liquid plastic is then injected into the molds cavity via the mold entrance. This plastic is held under extreme pressures for one to two minutes while it cools down in the mold. After this time frame expires, the hydraulic press opens and the molded object sticks to the mold half with the ejector pins. These pins are pushed by the hydraulic ram that is operated by a hydraulic system forcing the molded object out of the mold and the part falls in a bin. The process is then repeated automatically. Another process whereby these objects can be made is Metal Injection Molding (MIM) which is similar to Plastic Injection Molding. Various metals and alloys can be used with MIM technology.

Another example of a method of manufacturing the knot tie contiguity (1) and mounting bracket (4) would be CNC machining. A detailed drawing of the intended product is needed first to determine whether the product is feasible for fabrication. This drawing should contain all of the necessary dimensions, tolerances, material type(s) and views needed to convey the intention of the product. Once determined that the unit can be fabricated the information is then inputted off the actual drawing into the computer. In this example, CNC Software Inc., CAD/CAM software, and Mastercam version 7.1 can be used to draw the object via the print provided. The size of the stock is then determined and the geometry is centered within these boundaries. The object is then toolpathed and all of the required parameters are set for the computer to calculate the exact location of every line and arc (this includes the type of tool, size of tool, direction tool is to run, depth of cut, speed the tool needs to travel, etc.). After the parameters have been set, the actual toolpath is shown on the screen and is run to determine whether this toolpath should be accepted or declined. The program is then processed by the computer to write the appropriate G-codes for the Centroid software to understand. Once this code is written it is sent via computer network to the hard-drive of the machine. The Centroid software is used by the Magnum CAD/CAM router which is a computer-aided manufacturing machine that has a 4'×8' table top with vacuum hold-downs. A Porter Cable plunge router is set atop a movable gantry that can move in the x, y, and z directions (axis). This allows for the manufacturing of almost any two dimension shape. The machine operator retrieves the program from the hard drive and ensures that the right size bit is installed in the machine and the correct type of material is used. The operator then sets the tool planes of x, y, and z to the limitations listed in the program. Once all the preparations are made the operator starts the machine and the program runs in its entirety according to the G-codes that have been written for it by Mastercam. The machined part is then moved to the next process whereby it is deburred by a radius table router to ensure that there is no sharp edges or burrs left by the machining process.

The portable mounting strap (2) can be made by taking one inch wide strapping and cutting it to the desired length. Take a buckle (3) and loop the strap (2) around the area for securing a strap and sew it with industrial strength thread.

As can be easily understood from the foregoing, the basic concepts of the present invention may be embodied in a variety of ways. It involves knot tying techniques, and specifically the Lusk knot, as well as knot tie devices to accomplish the appropriate knot tying techniques. In this application, the knot tying techniques are disclosed as part of the results shown to be achieved by the various knot tie devices described and as steps which are inherent to their utilization. They are simply the natural result of utilizing the devices as intended and described. In addition, while some devices are disclosed, it should be understood that these not only accomplish certain methods but also can be varied in a number of ways (as examples, representative embodiments are shown in the figures but are not intended to be inclusive of all the possible embodiments of the invention). Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in functionally-oriented terminology, each aspect of the function is accomplished by a device. Apparatus claims may not only be included for the devices described, but also method or process claims may be included to address the functions the invention and each element performs. Neither the description nor the terminology is intended to limit the scope of the claims.

Further, each of the various elements of the invention and claims may also be achieved in a variety of manners. This disclosure should be understood to encompass each such variation, be it a variation of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "knot" should be understood to encompass disclosure of the act of "knotting"—whether explicitly discussed or not—and, conversely, were there only disclosure of the act of "knotting", such a disclosure should be understood to encompass disclosure of a "knot" and even a means for "knotting". Such changes and alternative terms are to be understood to be explicitly included in the description.

Additionally, the various combinations and permutations of all elements or applications can be created and presented. All can be done to optimize the design or performance in a specific application.

Any acts of law, statutes, regulations, or rules mentioned in this application for patent: or patents, publications, or other references mentioned in this application for patent are hereby incorporated by reference. Specifically, U.S. patent application Ser. No. 60/168,086 is hereby incorporated by reference herein including any figures or attachments, and each of the references in the following table of references are hereby incorporated by reference.

In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. However, as to each of the above, to the extent that such information or statements incorporated by reference might be considered inconsistent with the patenting of this/these invention(s) such statements are expressly not to be considered as made by the applicant(s).

In addition, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible in countries such as Australia and the like.

Thus, the applicant(s) should be understood to claim at least: i) each of the embodiments of the knot tying system as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

We claim:

1. A knot tie device, comprising a contiguous unit incorporating at least six different knot tie elements formed within said contiguous unit.

2. A knot tie device as described in claim 1, wherein said knot tie elements are selected from the group consisting of a line cleat, a rope loop, a strap loop, a knob, an eyelet, an open-closed S-hook, a tie down hook, a ring, a toggle, a pole, a tent stake, and a fishing hook, a lanyard, a pulley wheel, and a spring.

3. A knot tie device as described in claim 1, further comprising a contiguous unit hold down.

4. A knot tie device as described in claim 3, wherein said contiguous unit hold down comprises a portable strap mount.

5. A knot tie device as described in claim 3, wherein said contiguous unit hold down comprises a stationary mount.

6. A knot tie device as described in claim 1, further comprising a knot material differentiation element.

7. A knot tie kit, comprising:

a. a container;

b. a contiguous unit incorporating at least six different knot tie elements formed within said contiguous unit; and c. instructional material.

8. A knot tie kit as described in claim 7, further comprising components selected from a group consisting of a knot material, a knot cord, a knot strap, a knot tie contiguity hold down, a portable strap mount, a stationary mount, and a knot material differentiation element.

9. A knot tie kit as described in claim 7, wherein said knot tie elements are selected from the group consisting of a line cleat, a rope loop, a strap loop, a knob, an eyelet, an open-closed S-hook, a tie down hook, a ring, a toggle, a pole, a tent stake, a fishing hook, a lanyard, a pulley wheel, and a spring.

10. A knot tie kit as described in claim 9, further comprising a contiguous unit hold down.

11. A knot tie kit as described in claim 10, wherein said contiguous unit hold down comprises a portable strap mount.

12. A knot tie kit as described in claim 10, wherein said contiguous unit hold down comprises a stationary mount.

13. A knot tie kit as described in claim 7, further comprising a knot material differentiation element.

14. A method of producing a knot tie device, comprising the steps of:

a. providing at least six knot tie elements;

b. forming a contiguous unit; and c. incorporating said at least six knot tie elements within said contiguous unit.

15. A method of producing a knot tie device as described in claim 14, further comprising the step of holding said contiguous unit in a fixed position.

16. A method of producing a knot tie device as described in claim 14, further comprising the step of providing multiple configurations of at least one knot tie element to differentiate between knot materials.

* * * * *